April 17, 1928.
A. H. STEBBINS
1,666,475
DUST EXTRACTOR
Filed Oct. 3, 1925
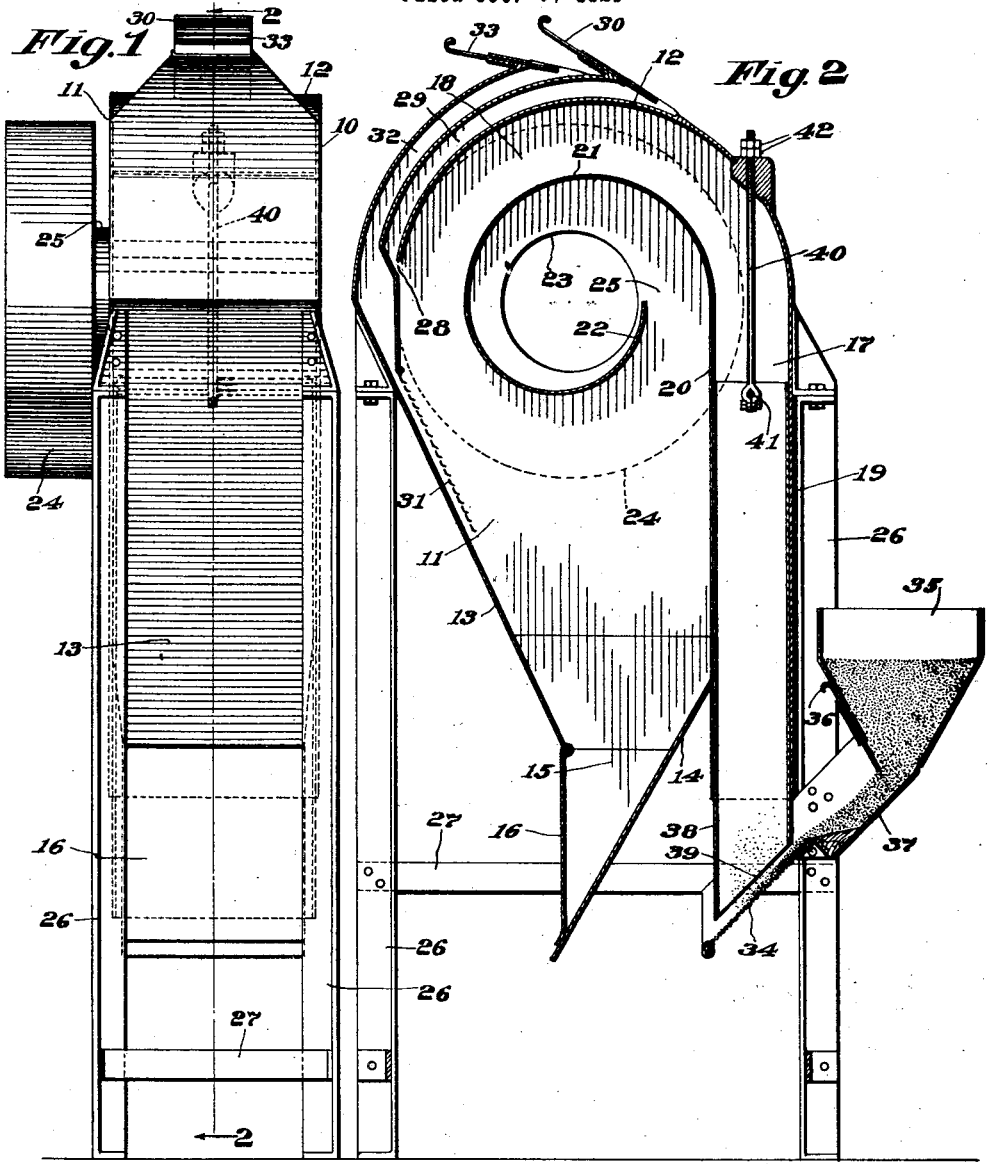
INVENTOR:
Albert H. Stebbins
BY Robt P. Heins.
ATTORNEY Patented Apr. 17, 1928.

1,666,475

UNITED STATES PATENT OFFICE.

ALBERT H. STEBBINS, OF LOS ANGELES, CALIFORNIA.

DUST EXTRACTOR.

Application filed October 3, 1925. Serial No. 60,207.

This invention relates to dust extractors and also to a combined dust extractor and classifier.

Heretofore, in treating fine materials, air has been employed to separate or classify the materials into different grades, and a dust extractor has been employed to remove from the air the fine dust-like material carried off by the air during the classification of the materials, but these operations have been usually carried out by separate and independent machines.

The present invention is directed to a simple and efficient construction adapted to classify the materials delivered thereto and also to remove the dust from the air used in the classifying operation.

One important feature of the invention resides in a combined dust extractor and classifier which is so constructed that the means for exhausting air from the dust extractor serves also to draw air upward thru materials passing over a screen to effect their separation.

Another feature of the invention resides in the novel construction of the dust extractor whereby the dust is thrown outward and downward to collect in the lower portion of the dust extractor while the dust freed air near the central portion of the receptacle is removed therefrom.

Still another feature of the invention resides in adjustable means for admitting a small volume of air thru a wall of the receptacle to thereby regulate the size of materials that will be removed from the air by the dust extractor.

Other features of the invention and novel combination of parts in addition to the above will be hereinafter described in connection with the accompanying drawings which illustrate one good practical form of the invention.

In the drawings:—

Fig. 1 is a side elevation of the combined dust extractor and classifier of the present invention; and Fig. 2 is a sectional view taken on the line 2—2 of Fig. 1.

In the construction shown the dust extractor consists of a receptacle having a large upper end portion and a reduced portion at its lower end forming a dust receiving hopper. The receptacle is provided with the spaced side walls 10 and 11 and the upper portion of the receptacle is provided with the curved wall 12, while the lower portion is provided with the downwardly converging walls 13 and 14 that serve to direct the materials which settle therein into the hopper 15, which hopper is provided with a swinging gate 16 thru which the materials that collect therein may be discharged.

The construction of the dust extractor is such that the dust laden air to be treated is drawn upwardly thru the upright conduit 17 formed between the spaced side walls 10 and 11, and the upper portion of this conduit is curved as at 18 so that as the dust laden air passes around this curved portion the heavier particles will be thrown outwardly by centrifugal force away from the central portion of the receptacle and will move downwardly within the receptacle at one side thereof into the hopper 15. The vertical conduit 17 is formed by the spaced walls 19 and 20, the opposite edges of which are secured to the side walls 10 and 11 to form a conduit which is rectangular in cross section. The curved portion 18 of this conduit is formed by the curved wall 21 which is shown as a continuation of the wall 20, and the wall 21 is secured in spaced relation to the upper curved wall 12, and has its opposite side edges secured to the spaced side walls 10 and 11, and it will be noted that the lower portion of the curved wall 21 is bent around in a spiral manner to form a conduit or pipe 22 that extends transversely of the receptacle between the side walls 10 and 11. Means is provided for exhausting air from the transversely extending conduit 22 and to this end, in the construction shown, an opening 23 is formed in the side wall 11 of the receptacle and a suction fan 24, the casing of which is connected to the side wall 11 by the pipe 25, serves to draw air from the conduit 22 thru the opening 23. This serves to exhaust air from the central portion of the receptacle by drawing air into the conduit 22 thru the pipe 25 which, it should be noted, is disposed at the opposite side of the transversely extending conduit from the discharge end of the curved inlet conduit 18. This is important because it gives the heavier particles within the air an opportunity to move downwardly within the receptacle into the hopper 15 before the air is drawn into the transversely extending conduit 22.

The construction so far described may be conveniently formed of sheet metal, and the dust extracting receptacle is shown as supported by spaced uprights 26 connected by transversely extending braces 27.

In construction described it will be understood that the suction fan 24 by exhausting the air within the receptacle serves to draw dust laden air into the receptacle thru the conduit 17 and curved portion thereof 18, and that the whirling movement imparted to the dust laden air while passing around the curved portion of the conduit 18 will throw the heavier particles outward and downward away from the central discharge conduit 22 so that the air which enters this discharge conduit will be free from the heavier particles of dust.

It is desirable to provide means by which the size of the materials that are separated out of the air by the dust extractor may be varied, and to this end, in the construction shown, means is provided for admitting auxiliary jets or currents of air into the receptacle near the discharge end of the curved conduit 18. A small volume of air is admitted into the receptacle thru the slot 28, thru which it is drawn by suction within the receptacle, and this slot, in the construction shown, leads from a curved air chamber 29 the air inlet of which is controlled by the sliding gate 30. Upon opening the sliding gate 30 the desired amount of air will be permitted to enter the dust extracting receptacle thru the slot 28. This jet of air will move across the path of the particles of heavy dust that have been thrown outwardly against the outer wall of the conduit 18 by centrifugal force and will tend to direct inwardly the lighter particles which may be also traveling in this portion of the receptacle, thereby helping to separate the fine from the coarse particles of dust.

In order to further remove the fine particles from the heavier particles of dust moving downwardly within the receptacle near the wall 13, a number of small air jets are provided within the receptacle by mounting therein the perforated sheet 31 at a position below the discharge end of the curved inlet conduit 18 and in spaced relation to the wall 13. Air is admitted to the space between the perforated sheet 31 and the wall 13 by the air inlet chamber 32, the air inlet opening of which is controlled by the adjustable gate 33 and the suction within the receptacle will serve to draw small jets of air inwardly thru the various apertures of the plate 31 so that these jets of air will pass thru the heavier particles of dust moving downwardly within the receptacle and will remove therefrom the lighter particles that might otherwise be carried down by the heavier dust.

As above stated, the present invention relates not only to a dust extractor, but also to a combined dust extractor and classifier, and to this end an inclined screen 34 is supported below the lower end of the intake conduit 17. Materials to be treated may be delivered to the inclined screen by a hopper 35 having the adjustable gate 36 for controlling the flow of materials from the hopper. The materials upon leaving the hopper slide down the inclined chute 37 and are delivered to the upper side of the screen 34 to move over its inclined surface under the force of gravity, and as the materials move over the surface of the screen, air is drawn upwardly thru the screen to carry upwardly into the dust extracting receptacle the lighter materials, while the heavier particles which the air is not able to lift are discharged from the lower side of the screen. It will be understood that the function of the screen 34 is to provide a material supporting surface thru which air may be drawn, and is not for the purpose of sifting or screening the materials delivered thereto.

It is desirable to provide means for varying the distance between the lower end of the receptacle 17 and the screen 34, and to this end, in the construction shown, a pipe 38 is mounted telescopically within the conduit 17 to slide therein, and the lower end of this pipe is cut away as at 39 at an inclination corresponding to the inclination of the screen 34, as shown. The pipe 38 is conviently supported within the conduit 17 by a bolt 40 secured to the upper ends of this pipe at 41, and passes upwardly thru a hole in the upper portion of the receptacle, and the pipe 38 may be raised and lowered by adjusting the nuts 42 at the upper end of the bolt 40.

As a result of the construction described the fan 24 serves not only to operate the dust extractor, but serves also to draw air upwardly thru the screen 34 to effect a separation or classification of the materials as they pass over the screen, and a second separation or classification of the materials is effected within the dust extractor.

What is claimed is:

1. A dust extractor comprising in combination, a receptacle having a large upper end portion and a dust collecting portion at its lower end and having spaced side walls, an air exhaust conduit extending transversely of the receptacle between said side walls and having an opening extending lengthwise of the conduit, an inlet conduit in the upper part of the receptacle and curved about said exhaust conduit, means for exhausting air from the discharge conduit to draw dust laden air into the receptacle thru the curved inlet conduit so that the heavier particles are thrown outwardly away from the discharge conduit to settle in the receptacle, and means for admitting a jet of air into the curved inlet conduit thru a side wall thereof.

2. A dust extractor comprising in combination, a receptacle having a dust collecting portion at its lower end and spaced side walls, an air exhaust conduit extending transversely of the receptacle between said walls and having an opening extending along the conduit, an inlet conduit in the upper part of the receptacle and curved about said exhaust conduit, means for exhausting air from the discharge conduit to draw dust laden air into the receptacle thru the curved inlet conduit so that the heavier particles are thrown outwardly away from the discharge conduit to settle in the receptacle, and means for directing small jets of air into the receptacle in promote separation of the finer particles from the heavier particles.

3. A dust extractor comprising in combination, a receptacle, a conduit for removing air from the receptacle and extending transversely therein between its side walls, an air inlet conduit curved about the transversely extending conduit, means for exhausting air from the transversely extending conduit to draw dust laden air into the receptacle thru the curved conduit so that the heavier particles are thrown outwardly by centrifugal force away from the discharge conduit and move downwardly in the receptacle, and adjustable means for admitting a small volume of air into the receptacle thru a wall thereof to control the size of the materials deposited in the receptacle.

4. A dust extractor, comprising in combination, a closed receptacle having a drum shaped portion and a lower portion that forms a collecting chamber, an exhaust pipe extending transversely of said drum portion in spaced relation to the walls thereof to form an annular air passage between the pipe and walls of the receptacle, a conduit positioned along side the collecting chamber and adapted to direct dust laden air upwardly within its passage to said annular air passage, means for feeding the materials to be treated across the lower end of said conduit so that the lighter particles will be picked up by the air entering the conduit, said exhaust pipe being provided with an air inlet opening that faces away from the discharge end of said annular passage and which is located adjacent the inner curved wall of said annular passage, means for exhausting air from said transversely extending pipe to cause the dust-laden air to travel through said annular passage with a whirling movement that throws the heavier particles outwardly by centrifugal force away from said opening and into the collecting chamber, and means for introducing a jet of air into said annular passage adjacent the outer curved wall thereof.

5. A dust extractor, comprising in combination a closed receptacle having a drum shaped upper portion and a lower portion that forms a collecting chamber, a conduit extending transversely of said drum portion in spaced relation to the walls thereof to form an annular air passage between the conduit and walls of the receptacle, a second conduit positioned alongside the collecting chamber and adapted to direct dust-laden air upwardly within its passage to said annular air passage, means for feeding the materials to be treated across the lower end of the second conduit so that the lighter particles will be picked up by the air entering the conduit, said first mentioned conduit being provided with an air inlet slot extending lengthwise of the same and positioned to face away from the entrance of the air into the collecting chamber through the annular air passage, means for exhausting air from said transversely extending conduit to cause the dust-laden air to travel through said annular passage with a whirling movement that throws the heavier particles outwardly by centrifugal force away from said slot and into the collecting chamber, and means for introducing a jet of air into said annular passage adjacent the outer curved wall thereof.

6. A dust extractor comprising in combination, a receptacle, a conduit for removing air from the receptacle and extending transversely therein between its side walls, an air inlet conduit curved about the transversely extending conduit, means for exhausting air from the transversely extending conduit to draw dust laden air into the receptacle through the curved conduit so that the heavier particles are thrown outwardly by centrifugal force away from the discharge conduit to settle in the receptacle, and means for directing a jet of air into said curved conduit across the path of the materials traveling therein to promote the separation of the materials.

In testimony whereof, I have signed my name to this specification.

ALBERT H. STEBBINS.